(12) United States Patent
King et al.

(10) Patent No.: US 6,756,093 B1
(45) Date of Patent: Jun. 29, 2004

(54) CELLULOSE CASING FOR FOOD PRODUCTS

(75) Inventors: Edmund King, Hango (FI); Yngve Klingenberg, Hango (FI); Stig Sannholm, Hango (FI); Tuula Lindberg, Hango (FI)

(73) Assignee: Eriksson Capital AB, Mariehamn (FI)

( * ) Notice: Subject to any disclaimer, the term of this patent is extended or adjusted under 35 U.S.C. 154(b) by 125 days.

(21) Appl. No.: 10/111,677
(22) PCT Filed: Oct. 25, 2000
(86) PCT No.: PCT/FI00/00922
§ 371 (c)(1), (2), (4) Date: Jun. 7, 2002
(87) PCT Pub. No.: WO01/30165
PCT Pub. Date: May 3, 2001

(30) Foreign Application Priority Data

Oct. 26, 1999 (FI) .................................................. 992311

(51) Int. Cl.$^7$ ........................ A22C 13/00; B29D 22/00; B29D 23/00; F16L 11/00
(52) U.S. Cl. .................... 428/34.8; 428/35.6; 428/35.5; 138/118.1
(58) Field of Search .............................. 428/34.8, 34.9, 428/35.1, 35.6, 36.9, 36.91, 36.92, 35.5; 138/118.1

(56) References Cited

U.S. PATENT DOCUMENTS

| | | |
|---|---|---|
| 4,336,828 A | 6/1982 | Balser et al. |
| 4,670,273 A | 6/1987 | Hammer et al. |
| 4,944,970 A | 7/1990 | Stenger et al. |
| H1592 H | 9/1996 | Nicholson |

FOREIGN PATENT DOCUMENTS

| | | | |
|---|---|---|---|
| DE | 35 43 633 A1 | 6/1986 | |
| DE | 198 14 924 A1 | 10/1999 | |
| EP | 0 692 194 A1 * | 1/1996 | ........... A22C/13/00 |
| GB | 1062421 | 3/1967 | |
| WO | 99/55164 A1 | 11/1999 | |

* cited by examiner

Primary Examiner—Harold Pyon
Assistant Examiner—Michael C. Miggins
(74) Attorney, Agent, or Firm—Birch, Stewart, Kolasch & Birch, LLP

(57) ABSTRACT

The invention relates to cellulose casings for food products and more particularly to pigmented tubular cellulose casings and to a method for the manufacture thereof. In the method for the manufacture of pigmented cellulose casings perylene tetracarboxylic acid pigment, in admixture with an additional pigment/pigments, is incorporated in the casing in order to produce a casing, which when stuffed with food products, produces the appearance of the product being naturally smoked, mahogany colored or any shade of red color. The additional pigment is selected from the group comprising (-phthalocyanine, diazo and monoazo pigments. The pigmented cellulose casing comprises 0.4–4 wt %, preferably 1–2 wt % of perylene tetracarboxylic acid.

7 Claims, No Drawings

CELLULOSE CASING FOR FOOD PRODUCTS

This application is the national phase under 35 U.S.C. § 371 of PCT International Application No. PCT/FI00/00922 which has an International filing date of Oct. 25, 2000.

BACKGROUND OF INVENTION

The present invention relates to cellulose food casings and more particularly to transparent pigmented tubular cellulose food casings and to a method for the manufacture thereof.

Cellulose casings are widely used in food industry, specially in meat industry in the production of stuffed food products, such as sausages and the like, and they often are coated with various substances or they have substances incorporated into the casing.

Cellulose casings are supplied in great lengths that are folded into highly compressed pleats forming rigid tubes formed of regenerated cellulose and containing plasticizers such as water and/or a polyol such as glycerine. The cellulose used for the manufacture of casings is most commonly produced by the so-called "viscose process" wherein viscose, a soluble cellulose derivative, is extruded as a tubular film through an annular die into coagulating and regenerating baths to produce a tube of regenerated cellulose. The tube is subsequently washed, plasticized and dried. The casing may be non-reinforced or reinforced with fibers such as paper.

In the "viscose process" natural cellulose is treated with a caustic solution to activate the cellulose to permit derivatization and to extract certain alkali soluble fractions from the natural cellulose. The alkali cellulose obtained is shredded, aged and treated with carbon disulphide to form sodium cellulose xanthate, which is then dissolved in a weak caustic solution. The viscose solution is ripened, filtered, deaerated and extruded.

Food casings made of derivatized cellulose usually contain additives such as colorants incorporated in or onto the casing. Liquid smokes which impart a smoky flavour and a reddish colour to the food product may also be incorporated in or coated on the casings.

From U.S. Pat. No. 4,336,828 a fiber-reinforced metallic luster pigmented tubular casing and a process for the manufacture of it are known. In the manufacture of the fiber-reinforced tubular casing, a pearlescent flake pigment which preferably comprises primarily titanium dioxide-mica silver or gold or copper pigment, is mixed with an alkaline solution of commercial-grade cellulose xanthogenate, and a long fiber paper reinforced substrate is contacted and impregnated with the obtained mixture and then the impregnated mixture is hardened on the said substrate. From US-patent H1,592 is known a cellulosic food casing made from non-derivatized cellulose and N-methylmorpholine-N-oxide, wherein colouring agents such as reds, blues and yellows may be introduced into the cellulose solution prior to extrusion from the die. In patent DE 3543633 are disclosed sausage casings for raw-type sausages which are manufactured from fiber-reinforced regenerated cellulose tubes and coated on the inner surface with a water-insoluble cationic resin. The outer surface of the cellulose tubes contains 8–20% pigment and only little pigment is present at the inner cellulose surface.

Variety of colours are used in casings and usually pigments are incorporated into the cellulose prior to extrusion. The commonly used red colour or different shades of red, such as reddish-brown, "colour of a well-smoked" and specially mahogany colour in casings is usually achieved by using vat-dyeing technology based for example on the Indanthren group of dyes (these dyes are manufactured by Dyestar Company). The colouring of the casings is accomplished by injecting the dye or pigment into viscose, then mixing to obtain a good dispersion of the dye and viscose, followed by impregnating the fibrous casing paper support of substrate, and then coagulating the mixture on or in the paper followed by regeneration. Once the cellulose is regenerated using baths containing diluted sulphuric acid together with ammonium and sodium sulphate salts, the casing as a flattened tube is passed into a reducing alkaline sodium hydrosulphite bath, which renders the vat-dye soluble to facilitate its movement between the swollen cellulose molecules or chains of cellulose. Thereafter the tubing is passed to an alkaline peroxide oxidizing bath which has the effect of re-crystallizing the Indanthren dye captivated between adjacent cellulose chains and finally the whole process being completed by a sulphuric acid neutralization bath closing up the cellulose chains, which are swollen under the effect of alkali, to discourage migration. Thus, a highly transparent or clear casing with a reddish or mahogany colour, giving the product a desired smoked appearance, is obtained.

Also other pigments are used to provide colours or shades other than mahogany such as reds, browns, whites, metallic luster pigments, blacks, blues, greens, yellows, oranges, many of which are used either alone or in a mixture. However, compared to the shades provided with Indanthren type of dyes and other vat-dyes the casings provided by these pigments tend to be flat and opaque.

The widely used vat-dyeing technology has some major disadvantages. In the processing there lies a need for extra processing steps i.e. reducing by hydrosulphite bath, oxidizing by peroxide bath and neutralizing by acid baths. The additional baths contain up to 25 g/l of sodium hydroxide and between 5 and 35 g/l of sodium dithionite, used at a temperature of 25 to 55° C., which has the effect of converting the Indanthren dyes to their soluble reduced forms, followed either by a number of wash baths, the last of which can comprise an acid neutralisation stage, using approx. 10 to 60 g/l of sulphuric acid and a temperature of 15 to 65° C., to convert them back to their crystalline oxidised forms, or a number of wash baths containing also 2 to 20 g/l of dilute sodium peroxide solution at 15 to 45° C. to assist the conversion back to the oxidised forms, prior to neutralisation as before. The latter baths can contain strong corrosive chemicals, which can lead to a weakening of the cellulose structure of the casing. The use of these baths, while being costly to be kept refreshened with chemicals and hot water and mechanically maintained, they take up additional space and once so treated, the casing product is mechanically weaker than its non-vat-dyed counter-part because of the absence of such chemical interactions. Additionally, because several baths with lots of chemicals are used, environmentally undersired waste chemical solutions are formed.

Chemical reduction has from time-to-time been a problem with the Indanthren dyes if they have not been properly fixed in the casing i.e. between adjacent chains of cellulose within the wall of the casing. The phenomenon of reduction may occur in vat-dyed casings which contain meat emulsion, such as summer sausages, also known as balkan sausage. The sausage is often vacuum-packed for extended shelf-life reasons even up to 12 months and micro-organisms, such as bacteria, which are always present to a larger or lesser extent in such products, begin to act chemically and affect the oxidation state of the dye. In many cases this change in oxidation state is accompanied by a change in colour.

Oxidised colour, reddish brown changes to reduced form, dark green, which may give rise to complaints of the product being streaked black and therefore contaminated.

Based on the above it can be seen that there is a need for an improved method for the manufacture of a pigmented cellulose casing, particularly of a mahogany coloured cellulose casings and for a pigmented cellulose casing, particularly a mahogany coloured cellulose casing.

SUMMARY OF INVENTION

An object of the invention is to provide a method for the manufacture of a pigmented cellulose casing, particularly mahogany coloured cellulose casings and a pigmented cellulose casing, particularly a mahogany coloured cellulose casing obtained thereby, which are not subject to discolouration by virtue of microorganism activity in a vacuum pack.

A further object of the present invention is to achieve the appearance and aesthetics of the mahogany coloured cellulose casings based on Indrantren type of dyes without the processing steps required by a vat-dyeing technology.

A further object of the invention is to avoid or significantly reduce the disadvantages of the prior art dyeing technology, and to switch to an environmentally more friendly method.

Characteristics of the method for the manufacture of a pigmented cellulose casing and particularly of a mahogany coloured cellulose casing and of the pigmented cellulose casing, particularly the mahogany coloured cellulose casings are stated in the claims.

The above-identified objectives can be achieved and the disadvantages of the pigmented cellulose casings and of the methods for the manufacture thereof according to the state of the art can be avoided or reduced significantly by the method according to the invention. It has been realized that pigmented, red or reddish coloured and preferably transparent mahogany coloured cellulose casings with different shades of mahogany, particularly fibrous casings, with the appearance and aesthetics of the casings based on the Indanthren pigmenting system of the state of the art, having natural smoked colour, can be manufactured by incorporating into viscose a combination of specific pigments.

In the method according to the invention, for the manufacture of pigmented cellulose casings, perylene tetracarboxylic acid pigment in admixture with other pigments, preferably β-phthalocyanine, diazo and monoazo pigments, is incorporated in the casing in order to produce a casing, which may be transparent and which when stuffed with food products, produces the appearance of the product being naturally smoked, mahogany coloured or any shade of red colour.

Suitable pigments are perylene tetracarboxylic acid (Hostafine® Red P2GL LP, colour index P.R. 179), β-phthalocyanine (Hostafine® Blau B26, P.B. 15:3), diazo (Hostafine® Gelb HR, P.Y. 102), and monoazo (Viscofil® yellow RL, P.Y. 102) all manufactured by Clariant GmbH. These pigments are liquid suspensions, which are miscible in all proportions with water. In the casing 0.4–4 wt %, preferably 1–2 wt % of perylene tetracarboxylic acid is used in admixture with other pigments, preferably with 0.01–0.3 wt % of β-phthalocyanine and/or 0.3–2.6 wt % of diazo and/or monoazo pigments based on dry weight, to modify its hue and to create replacements for colours such as yellow, blue, mahogany, burgundy and natural smoked colours, previously obtained with vat-dyes, such as Indanthren dyes.

In the method according to the invention the pigments/dyes are either weighed or measured by volume and then diluted with water or in smaller batches with viscose, ready for injection into the main viscose line ahead of the casing extrusion die. Following the initial coagulation, regeneration and washing stages of the manufacture of cellulose casings, just washing of the pigmented casings and finally a plasticisation treatment are required. Coagulation follows extrusion of pigment/dye containing viscose into the paper substrate and treatment with dilute sulphuric acid solution containing 40–80 g/l of sulphuric acid, 8–80 g/l of ammonium sulphate and 150–250 g/l of sodium sulphate, when the cellulose-pigment/dye gel sets in the paper substrate. Then follows the regeneration of the sodium cellulose xanthate of the viscose into cellulose, using the aforementioned acid solution which undergoes progressive dilution and increasing temperature, from 20 to 35° C. to 35 to 65° C. during passage through between 5 and 15 baths. Platicisation in a polyol bath up to a casing, e.g. glycerol content, of 15 to 25% is the final wet process before drying for a so-called "regular casing". "Meat-cling" or "Easy-peel" finnishes may also be applied subsequent to the plasticisation stage prior to drying but these are optional.

To prepare viscose ahead of the viscose-pigment impregnation stage referred to above, wood pulp is slurried with sodium hydroxide solution, followed by removal of excess lye, to a sodium cellulose composition. As a pressed cake it is fed to a shredder and in a comminuted form the so-called alkali cellulose is oxidised. So oxidised the alkali cellulose is fed to a xanthation reactor, liquid carbon disulphide is introduced, and the reaction is allowed to proceed to completion, in the formation first of cellulose xanthate, prior to dissolving in sodium hydroxide solution. The sodium cellulose xanthate so formed is meta stable and at first undergoes a thermodynamic rearrangement in which the haphazardly substituted hydroxyl groups of the glycosidic units comprising the cellulose molecule are arranged more equitably among neighbouring glycoside unit hydoxyl groups, during which process viscose viscosity is seen to drop. At the same time the molecule also begins to dexanthate, which is to say a number of the carbon disulphide xanthate groups are lost from the molecule, resulting in a rise in viscosity and ultimately, if allowed to continue, to gelation. For the purposes of fibrous casing manufacture during the latter processes the viscose is filtered to remove any unreacted fibres and its degree of substitution is monitored. The viscose is extruded onto and into the paper substrate of the casing at a pre-determined ripening index.

The advantages of the method and the pigmented fibrous cellulose casings according to the invention are provided as follows. The vat-dyeing process is rendered redundant and thus the extra chemical treatments with strong corrosive chemicals, i.e. reducing by hydrosulphite bath, oxidizing by peroxide bath and neutralizing by acid baths can be avoided. The casings and the method for their manufacture according to the invention are environmentally more friendly and mechanically stronger since less chemicals are used to process them. The method according to the invention provides colours which are not subject to chemical reduction or to discolouration by virtue of microorganism activity in a vacuum-pack. Because the bulk of fibrous casings are sold un-pigmented most machines built to produce casings are not equipped with the vat-dyeing baths required to make the coloured casing, resulting in a lack of flexibility in the production. The method for the manufacture of pigmented casings according to the invention requires no vat-dyeing baths, which results in a considerably reduced production and delivery time.

DETAILED DESCRIPTION OF INVENTIONS

The invention is further illustrated by the following Examples, which however are not meant to limit the scope thereof.

EXAMPLES 1–3

Three pigmented fibrous casings were prepared with varying amounts of pigments. The recipes are provided in the following Table 1.

TABLE 1

| Example Number | 1 | 2 | 3 |
|---|---|---|---|
| Paper, length, m | 1000 | 1000 | 1000 |
| Paper, width, m | 1.24 | 0.124 | 1.58 |
| Paper, weight, kg/m2 | 0.017 | 0.017 | 0.021 |
| Paper, weight, kg/1000 m | 2.108 | 2.108 | 3.318 |
| Casing weight, kg/1000 m | 7.8 | 7.8 | 12.0 |
| Glycerol content % | 22 | 22 | 22 |
| Glycerol weight, kg/1000 m | 1.716 | 1.716 | 2.64 |
| Water content, % | 5.0 | 5.0 | 5.0 |
| Water weight, kg/1000 m | 0.39 | 0.39 | 0.50 |
| Viscose weight kg/1000 m | 46.8 | 46.8 | 73.6 |
| Cellulose content, % | 7.2 | 7.2 | 7.2 |
| Cellulose weight, kg/1000 m | 3.37 | 3.37 | 5.30 |
| Pigments: | | | |
| Hostafine* Rot P2GL*, kg/1000 m | 0.371 | 0.385 | 0.429 |
| Dry content, % | 35 | 35 | 35 |
| Dry weight, kg/1000 m | 0.130 | 0.135 | 0.150 |
| Amount in casing, % | 1.7 | 1.7 | 1.3 |
| Hostafine* Gelb HR*, kg/1000 m | 0.169 | 0.161 | none |
| Dry content, % | 43 | 43 | — |
| Dry weight, kg/1000 m | 0.073 | 0.069 | — |
| Amount in casing, % | 0.9 | 0.9 | — |
| Viscofil* Yellow RL | none | none | 0.810 |
| Dry content, % | — | — | 20 |
| Dry weight, kg/1000 m | — | — | 0.162 |
| Amount in casing, % | — | — | 1.4 |
| Hostafine* Blue B2G | 0.017 | 0.006 | 0.011 |
| Dry content, % | 48 | 48 | 48 |
| Dry weight, kg/1000 m | 0.008 | 0.003 | 0.005 |
| Amount in casing, % | 0.1 | 0.04 | 0.04 |
| Casing SCAN-P8:93 outside surface, % | 93.7 | 91.7 | 92.9 |
| Opacity (ISO 2471) inside surface, % | 96.5 | 96.2 | 95.3 |
| Colour of casing | mahogany | mahogany | mahogany |

Note*: "Hostafine" and "Viscofil" are registered trademarks of CLARIANT GMBH.

What is claimed is:

1. A pigmented cellulose casing, said casing comprising 0.4–4 wt % of perylene tetracarboxylic acid and additional pigment/pigments selected from a group consisting of β-phthalocyanine, diazo and monoazo pigments and the amount of β-phthalocyanine is 0.01–0.3 wt % and the total amount of diazo and/or of monoazo pigment is 0.03–2.6 wt %, calculated from the dry weight of the casing.

2. A pigmented cellulose casing according to claim 1, wherein the casing is a fibrous casing.

3. A pigmented cellulose casing according to claim 1, said casing comprising 1–2 wt % of perylene tetracarboxylic acid.

4. A pigmented cellulose casing according to claim 1 or 3, wherein the colour of the casing, when stuffed with food products, is any shade of red, of mahogany colour, burgundy colour or colour of naturally smoked.

5. A method for the manufacture of the pigmented cellulose casing according to claim 1, which casing when stuffed with food products, produces the appearance of the product being naturally smoked, mahogany coloured, burgundy coloured or any shade of red colour, wherein 0.4–4 wt % of perylene tetracarboxylic acid pigment in admixture with an additional pigment/pigments selected from a group consisting of β-phthalocyanine, diazo and monoazo pigments and the amount of β-phthalocyanine is 0.01–0.3 wt % and the total amount of diazo and/or of monoazo pigment is 0.03–2.6 wt %, calculated from the dry weight of the casing, diluted in water, are incorporated ahead of a casing extrusion die, into viscose which is extruded into a casing, the casing is then coagulated, then follows regeneration of sodium cellulose xanthate of the viscose into cellulose, washing and plasticisation.

6. A method according to claim 5, wherein the amount of perylene tetracarboxylic acid is 1–2 wt %, calculated from the dry weight of the casing.

7. A method according to claim 5 or 6, wherein the casing is a fribrous casing.

* * * * *